United States Patent [19]

Polovina

[11] Patent Number: 4,783,342

[45] Date of Patent: Nov. 8, 1988

[54] POLYMERIC FILM COATING METHOD FOR PROTECTING PLANTS, VEGETABLES AND FRUIT FROM DROUGHT

[76] Inventor: Walter Polovina, P.O. Box 06254, Fort Myers, Fla. 33906

[21] Appl. No.: 80,094

[22] Filed: Jul. 31, 1987

[51] Int. Cl.$^4$ .............................................. A01G 5/06
[52] U.S. Cl. ...................................................... 427/4
[58] Field of Search .......................................... 427/4

[56] References Cited

U.S. PATENT DOCUMENTS 3,669,691  1/1970  De Long et al. ...................... 427/4

Primary Examiner—Bernard Pianalto
Attorney, Agent, or Firm—Donavon Lee Favre

[57] ABSTRACT

This invention relates to a method of preserving plants during periods of drought by applying a solid, water permeable film which controls water loss, to the surface of the plants. The same film can also be used to preserve vegetables and fruit. The water permeable film is also effective to preserve cut flowers.

21 Claims, No Drawings

POLYMERIC FILM COATING METHOD FOR PROTECTING PLANTS, VEGETABLES AND FRUIT FROM DROUGHT

SUMMARY OF THE INVENTION

This invention relates to a method of preserving plants, vegetables and fruit by applying a polymeric coating, which controls water loss, to the surfaces of plants, vegetables and fruit during periods of drought. The polymeric coating is also effective to preserve cut flowers.

BACKGROUND OF THE INVENTION

In order to protect plants from frost many foam coating techniques and compositions have been devised, for example see U.S. Pat. Nos. 2,875,555; 3,555,727; 3,891,571; and 4,086,331. While useful for their intended purpose, foams are detrimental in imparting drought resistance to plants at high temperatures and in bright sun light, because the foams allow radiant heat to enter the plant but insulate the plant against the removal of heat. Other methods of protecting introduction of polyvinylpyrrolidone compositions or oil into the plant cell, for examples see U.S. Pat. Nos. 2,961,798; 3,045,394; and 4,219,965. The 965 patent also discusses transpiration of water. Transpiration control however requires penetration into the plant tissue. One disadvantage of introducing foreign substances into plant cells is the possibility that the foreign substances may enter the human food chain. Along the same lines, U.S. Pat. No. 3,399,990 discloses a method of closing plant stomata with alkenyl succinic acids. Other methods of protecting plants against drying out include coating the plants with materials that absorb and hold water, see U.S. Pat. Nos. 2,720,726 and 3,157,964. One possible disadvantage of using a water absorbing material to coat a plant is that after drying the coating material may draw moisture from the plant. The 964 patent discloses a second plastic moisture barrier which substantially prevents dehydration. Preventing a plant from transpiring water and or carbon dioxide could also lead to problems. Other U.S. Patents which disclose controlling plant transpiration include U.S. Pat. Nos. 3,791,839; 3,826,671; and 3,847,64. U.S. Pat. No. 3,611,635 discloses coating tobacco leaves by spraying the plants with a material, primarily alcohol or wax to reduce the nicotine content of the plant.

SUMMARY OF THE INVENTION

The present invention is primarily directed to a method of preserving the life of a living plant particularly under drought conditions. The method involves controlling water loss for the plant by coating at least a portion of the plant with a nonphytotoxic film having a moisture vapor transmission rate of from 80 grams per square meter per 24 hours to about 3000 grams per square meter per 24 hours. The purpose of the film is to allow the plant to eliminate a sufficiently small amount of water and other waste products so as to maintain life, but not enough to fatally dehydrate the plant. It is necessary that the film have a moisture vapor transmission rate of at least a small but sufficient amount to maintain plant life so that the plant survive drought without serious permanent injury. In order to protect the plant from any permanent injury, it is preferred that the film have a moisture vapor transmission rate of from about 100 grams per square meter per 24 hours to about 2000 grams per square meter per 24 hours. In order that the plant sustain minimum or no injury it is recommended that the film have a moisture vapor transmission rate of from about 800 grams per square meter per 24 hours to about 1500 grams per square meter per 24 hours. The water vapor transmission rate is determined by the procedure outlined in ASTM E-96-66 or by the TAPPI method T 464 os-79. Fine tuning of film selection will be dependent upon temperature and humidity conditions and the type of plant but is within the skill of the art following the disclosure of the present specification.

It is also preferred that the film have a continuous, non-foam, film structure to prevent heat build up in the plant on hot sunny days. The film is formed by applying an acrylic latex containing a water soluble polymer to the plant and allowing the composition to dry. Examples of acrylic latexes which can be used include Unocal Res 2131 and BF. Goodrich Hycar 26120 latexes and related acrylic copolymer latexes available from both companies and other companies. While the copolymers are preferred, the present invention is not restricted to them. Any polymer which provides, in combination with a water soluble or dispersible polymer, a film having the required water vapor transmission rate is operative.

The water soluble or water dispersible polymer (herein sometimes referred to as water soluble or dispersible) is preferably present in an amount of from 1% to 45% by dry weight of dry weight of acrylic polymer in the acrylic latex. Examples of water soluble or water dispersible polymers include alkaline treated casein, gelatin, fish derived, (both proteins) polyvinyl alcohol, polyvinylpyrrolidone and precooked ethylene oxide reacted corn starch.

The composition also preferably contains about 0.1% to about 3% of a surfactant the percentages based on total weight of composition.

Examples of surfactants include Surfynol TG-E (Air Products) and FC-120, an anionic surfactant from 3M that is an ammonium perfluoroalkyl sulfonate (25% active) in equal amounts of 2-butoxyethanol and water.

Compositions of the present invention also preferably contain about 0.2% to about 3% of an antimicrobial agent, the percentages based on total weight of composition. Examples of antimicrobial agents that can be used include methyl or propyl p-hydroxybenzoate, alone or in combination. (from Kalama Chemical, Inc.)

The preferred water soluble polymer of the conposition of the present invention is a water solubilized casein product. An example of a water solubilized casein is Ulasein 15 (a 15% solution of alkaline treated casein from Ultra Adhesive Co., Paterson, N.J.). The alkaline treatment solubilzes the casein.

The water soluble polymer of the film coating composition can also be a gelatin. An example of a gelatin that can be used is Hi Pure Liquid Gelatin, a 45% solids, fish derived protein, undeionized. (From Norland Products, Inc., N. Brunswick, N.J.)

Another water soluble polymer that can be used in the film forming composition is a polyvinyl alcohol made by hydrolyzing from 85% to 89% of the acetate groups from polyvinyl acetate.

Other examples of water soluble polymers that can be used in the film forming composition include polyethylene glycols of about 800 to 8000 molecular weight, polyvinylpyrrolidone, and chemicaiiy derived plant starch. An example of a chemically derived plant starch is Maizo 745 starch from American Maizo Products Co., Hammond, Indiana. The starch is an hydroxyethyl ether of corn starch, containing 1.6 to 2.0% of derived ethylene oxide based on dry starch weight. The dry starch contains from 10% to 12% of water and has a pH of 5.5 to 6.5. The starch powder is dispersed in cold water, and then soaked with stirring for 25 minutes at 190 degrees Fahrenheit as a 10% powder in 90% of water. About 2 to 5% by weight of starch solids based on acrylic latex solids is used All of the above classes of components of the film forming composition are well known in the art and specific components of the recited classes will be readily apparent to those skilled in the art guided by the present disclosure.

The film forming composition can also contain a combination of two or more water soluble polymers. The combination preferably has a combined weight of from 1% to 45% by dry weight of dry weight of acrylic polymer in the acrylic latex.

It is also important that the film have sufficient oxygen and carbon dioxide permeability to support plant life.

It is also important that the film be flexible. The use of acrylic polymers having glass transition temperatures from about −10 degrees Celcius to about 30 degrees Celcius results in films having the desired flexibility.

It is also preferred that the film of the present invention be a film containing less than 10% of water or be a dry film.

The method of the present invention is particulary useful in protecting plants growing in an arid region, planted in soil. The method of the present invention is also useful for potted plants as it reduces the need for frequent watering.

The method of the present invention is also useful for preserving fruits and vegetables, by preventing dehydration. The fruit or vegelable is coated with a nonphytotoxic film having a moisture vapor transmission rate of from a small but sufficient amount to preserve the fruit or vegetable to about 3000 grams per square meter per 24 hours. The same composition recited above for coating plants can be used to coat fruit and vegetables. Again it is preferred that the film have sufficient oxygen and carbon dioxide permeability to support respiration of the fruit or vegetable.

The same method and compositions used to preserve plants can be used to preserve cut flowers, again by preventing dehydration. Again, the cut flower is coated with a nonphytotoxic film having a moisture vapor transmission rate of from a small but sufficient amount to preserve the cut flower to about 3000 grams per square meter per 24 hours, and the film has sufficient oxygen and carbon dioxide permeability to support respiration of the cut flower.

The present invention also relates to a polymeric coating that is applied to the surfaces of plants, including crops and decorative plants. The coating composition is applied from a water based medium by spray application. The polymeric coating compositon contains a blend of polymers and preferably other ingredients to protect growing plants from the effects of drought. The suitable selection of polymers and the ratio of polymers disclosed above controls the evaporation of water from growing plants. This is especially useful during periods of drought, for instance. Reduction in water evaporation also aids in reducing cooling of the plant and protects growing plants from exposure to freezing temperatures of around 28 degrees Fahrenheit.

It has been discovered that a combination of an acrylic latex, or an acrylic copolymer latex is very useful when combined with other water soluble or dispersible polymer, to form films on plants which protect the plants against drought. The unique feature of the film formed by the acrylic latex and the water soluble or dispersible polymers on growing plants is the ability of the film to control the water contained in the plants by retarding the water evaporation rate within specific parameters.

Another useful property of the polymeric composition is to provide a mechanism of supplying various water soluble nutrients directly to the plant. The nutrients are added to the latex and become part of the film coated onto the plant. During periods of drought when the plant is incapable of extracting nutrients from the soil, it is capable of extracting necessary nutrients from the film. It is also a much more efficient way of applying nutrients as much of the fertilizer applied to the soil is lost for example by conversion of nitrogen compounds to nitrogen by bacteria and run off of water soluble nutrients into waterways causing pollution.

The applied polymeric film may also serve to convey and retain insecticides for the control or destruction of leaf eating insects.

In order that the composition of polymers be applied uniformly over and around the whole plant, it is preferred that a surfactant be incorporated into the latex composition for improved wetting. It is also preferred that a preservative or an antimicrobial agent be added to the latex composition to extend the shelf life of the latex composition. By latex composition is meant the film forming latex-water soluble or water dispersible compostion.

Some examples of suitable water soluble or dipersible polymers are discussed above. The present invention is not limited to those enumerated because one of skill in the art following the present teachings could easily arrive at many different compositions for forming films on plants having the water vapor transmission rates of the present invention. The water dispersible or water soluble polymers are merely given as examples of material that can be used separately or in various combinations, together with the selected acrylic latex base to achieve the intended water transmission rates in the film formed on the plant surface.

The water soluble or dispersible polymer component is preferably used at a level of from about 1% to about 60% of the dry weight of the acrylic base. The surfactant can be added at a level of from about 0.2% to about 2% of the total liquid product weight. The preservative can be employed at a level of from about 0.1% to about 3% of the total liquid product weight.

Some of the water soluble or water dispersible polymer ingredients that are combined in the acrylic latex composition are specifically added to absorb, retain, or transmit moisture in the dried polymer film adhering on the plant surface. Some of the polymer films can be formulated to maintain certain desired properties as required by the plant, or during storage, or shipment of certain vegetables and fruit, such as, citrus, bananas, cucumbers, and after an elapsed time be readily, and completely removed by water washing.

In the examples that follow as well as other parts of the specification and claims, all parts and percentages are by weight unless otherwise indicated or apparent from the context. Molecular weight is weight average molecular weight. Water vapor transmission rates are determined by ASTM E96-66, Procedure E at 90% relative humidity and 100 degrees Fahrenheit for a 2 mil film, or TAPPI T 464 os-79 for a 2 mil film. In the specification and claims, water vapor transmission rates refer to rales determined by the above two recited procedures. In cases where the two procedures result vastly different rates, the rates determined by the TAPPI procedure shall take precedence. In actual use the water vapor transmission rate will be much higher because the film applied to plants will be much thinner than that used to establish water vapor transmission rates. The reason for the difference is that thicker films are needed to run the water vapor transmission tests than are needed to protect plants from drought, and very thin films are preferred on plants. The films of the present invention are solid films, in most cases clear films. In the preferred embodlment, the films of the present invention are not gels, though some may pass through a very brief gel state upon drying. While the films of the present invention are solid, they preferably are not brittle in the temperature range of their use. One of the desired properties of the air dried films of the present invention is their high degree of flexibility as shown by a low glass transition temperature (Tg). The preferred Tg. of the solid film forming polymer component lies in the range of about −10 degrees Celcius to about 30 degrees Celcius.

The various ingredients of the water vapor transmission rate controlling compositions of the present invention are formulated with water at a total solids concentration of about 0.1% to 25%.

The most desirable concentration is that used for spray on application and is formulated at a total solids concentration of about 1% to 5% total solids concentration.

The following examples of some of the polymer compositions that were evaluated better describe the invention and some of the properties that are achieved by these novel coatings. The following examples are merely illustrative and should not be construed as limiting the invention.

DETAILED DESCRIPTION

Example 1

A plant treating conposition was formulated starting with 200 parts (100 parts by dry weight) of Goodrich Hycar Acrylic Latex 26120. Hycar is a registered trade mark of BF Goodrich.

The latex is an aqueous anionic dispersion of an acrylic ester copolymer. The copolymer is modified with carboxylic groups and heat reactive sites. The latex has a glass transition temperature of −11 degrees Celcius, contains a synthetic anionic emulsifier, contains 50% solids, has a specific gravity of 1.07, a surface tension of 48 dynes, and a Brookfield viscosity (cP) of 115. To the latex is added slowly with stirring 195 parts of deionized water. While continuing mixing, 13.5 parts of Ulasein 15 solution (2 parts of casein solids in water) are added and the stirring continued until the Ulasein is dispersed. Ulasein 15 solution is an unadulterated, stabilized, alkali stabilized solution of casein in water, and has a pH of 6.5 to 7.5 and an off white color. It is commerclally available from Ultra Adhesives of Paterson N.J. Then 0.8 parts (0.6 parts on a dry basis) of Surfynol TG-E surfactant is added dropwise. Surfynol TG-E is a nonionic mixture of 2,4,7,9-tetra-methyl-5-decyne-4,7-diols. Finally 2 parts of Methyl Paraben preservative is added. The preservative used is the methyl ester of para-hydroxy benzoic acid. The final mixture is stirred for five minutes until the preservative dissolves to form a concentrate. One part by volume concentrate is mixed with 10 to 15 parts by volume water to form a coating composition of the present invention.

A clear film having a thickness of 2 mils was cast from the concentrate. The water vapor transmission rate was determined by TAPPI method T 464 os-79 and found to be 64.4 grams per hundred square inches per 24 hours which is 998 grams per square meter per 24 hours.

Tests show the effect of the above coating composition on plants to be essentially the same as those of the coatng composition of Example 2.

Example 2

A plant treating composition was formulated starting with 200 parts (100 parts by dry weight) of Unocal 76 Res 2131 latex. Unocal 76 Res 2131 latex is a copolymer containing about 10% acrylonitrile, 43% butyl acrylate, 43% methyl acrylate and 4% of N-methylol acrylamide possibly in combination with other cross linking agents. A 2 mil thick film formed from the latex has a glass transition temperature of −9 degrees Celcius and a water vapor transmission rate of 60 grams/square meter/24 hours according to ASTM E-96.

To the latex is added slowly with stirring 195 parts of deionized water. While continuing mixing, 13.5 parts of Ulasein 15 solution (2 parts of casein in water) are added and the stirring continued until the Ulasein is dispersed. Ulasein 55 solution is an unadulterated, stabilized, alkali stabilized solution of casein in water, and has a pH of 6.5 to 7.5 and an off white color. It is commercially available from Ultra Adhesives of Paterson N.J. Then 0.8 parts (0.6 parts on a dry basis) of Surfynol TG-E surfactant is added dropwise. Finally 2 parts of Methyl Paraben preservative is added. The preservative used is the methyl ester of para-hydroxy benzoic acid. The final mixture is stirred for five minutes until the preservative dissolves to form a concentrate. One part by volume concentrate is mixed with 10 to 15 parts by volume water to form a coating composition of the present invention.

A clear film having a thickness of 2 mils was cast from the concentrate. The water vapor transmission rate was determined by TAPPI method T 464 os-79 and found to be 50.4 grams per hundred square inches per 24 hours which is 781 grams per square meter per 24 hours.

The following tests were run using the coating composition of the present Example 2.

A number of indoor decorative plants that are maintained in the laboratory and several office areas have been spray drenched with the coating composition of Example 2. These plants that were usually watered once a week, or at worst once every two weeks, have now been observed without any watering for up to three months, and some up to four months. The plants look healthy, and because of the latex coating have an attractive surface gloss. These plants are:
  two-Lady Palms
  one-Swedish Ivy
  two-Rubber Trees
  one-Croton Laboratory testing for freeze-thaw protection Equipment used: A large, floor model, Thermotron Environmental Test Chamber, model EL-2400. This chamber contains an 8 cubic foot cabinet with a double glass window, and is designed to freeze to -90 degrees Fahrenheit or heat to 350 degrees Fahrenheit by manual or automatic cycling. It is equipped with two cascade type refrigerators with forced air cooling and heating on cycle demand. Plants Tested:
(1.) 6 inch high potted tomato seedlings
(2.) 4 inch high potted sweet pepper seedlings.
(3.) cucumber plants, starting to vine, in 4 inch diameter pots.

Procedure

Four plants of each variety were selected of about the same size and vigor. Three of each group of four were sprayed using a hand pump to the point of drenching each with the coating composition of this Example 2. The plants were dried at room temperature for about 24 hours and then were placed, together with the untreated controls into the environmental test chamber. The chamber was set at a freezing temperature of 28 degrees Fahrenheit for a period of two hours. The cycle was switched to heating rapidly to 110 degrees fahrenheit for three hours. The plants were examined and the freeze-thaw cycle repeated once more. Results:

(1) The controls in each plant variety withered and dried (turned brown) after being removed from the chamber and allowed to stand for days in the laboratory.

(2) The group of three tomato plants survived and three days later were successfully field planted.

(3) The group of three sweet pepper plants survived and three days later were planted in a nearby field.

(4) Of the group of three, two cucumber vines survived well, but the third plant appeared sickly. However, all three were field planted and survived. The third one still appeared stunted by comparison.

The coating composition of Example 2 was sprayed on cut sod which was transported by truck, and was very effective in preventing the cut sod from drying out.

Cut flowers were dipped into the coating composition of Example 2, and the coating preserved them much longer than they would have been preserved had they not been coated.

Green bananas were sprayed with the coating composition of Example 2, and the weight loss of the bananas during storage was reduced compared to bananas that were not coated. In addition the ripening process of the coated bananas was accelerated by the coating. and the appearance of the bananas was improved by the coating.

Field tests of the coating composition of Example 2 showed improved yield of apples and plums, freeze protection of tomatoes, protection of tomatoes and peppers from heat, and frost protection of Hibiscus. When used in combination with liquid fertilizers on tomatoes, self supporting tomato plants resulted, requiring no stakes.

Example 3

A plant treating composition was formulated starting with 170 parts (85 parts by dry weight) of Unocal 76 Res 2131 latex described above. To the latex is added slowly with stirring sufficient deionized water to reduce the solids to 22%. While continuing mixing, 14.5 parts (dry weight) of a 45% solids gelatin in water solution are added and the stirring continued until the gelatin is dispersed. The gelatin solution has a viscosity of 6000 cps and a pH of 5.4. The gelatin has a molecular weight of 60,000. Then 0.25 parts of a surfactant consisting of a nonionic mixture of 2,4,7,9-tetra-methyl-5-decyne-4,7-diols is added dropwise. Finally 0.25 parts of Methyl Paraben preservative is added. The preservative used is the methyl ester of para-hydroxy benzoic acid. The final mixture is stirred for five minutes until the preservative dissolves to form a concentrate. One part by volume concentrate is mixed with 10 parts by volume water to form a coating composition of the present invention.

Example 4

A plant treating composition was formulated starting with 170 parts (85 parts by dry weight) of Unocal 76 Res 2131 latex. To the latex is added slowly sufficient deionized water to reduce the solids content to 25%. While continuing mixing, 9.6 parts of polyvinyl alcohol are added and the stirring continued until the polyvinyl alcohol is dispersed. The polyvinyl alcohol is 87–89% hydrolyzed has a viscosity of 4 cps and a pH of 6.5 in a 4% aqueous solution. Then 0.25 parts of a surfactant consisting of a nonionic mixture of 2,4,7,9-tetra-methyl-5 decyne-4,7 diols is added dropwise. Finally 0.25 parts of Methyl Paraben preservative is added. The preservative used is the methyl ester of para-hydroxy benzoic acid. The final mixture is stirred for five minutes until the preservative dissolves to form a concentrate. One part by volume concentrate is mixed with 10 parts by volume water to form a coating composition of the present invention.

Example 5

A plant treating composition was formulated starting with 170 parts (85 parts by dry weight) of Hycar 26083 Acrylic latex. Hycar is a registered trade mark of BF Goodrich. The latex contains a carboxy-modified acrylic polymer, is 52% solids, has a specific gravity of 1.07, a surface tension of 6.0 dynes/cm, a Brookfield viscosity of 60 cP and contains a synthetic anionic emulsifier. A film formed from the latex has a glass transition temperature of −15 degrees Celcius.

To the latex is added slowly with stirring 165 parts of deionized water. While continuing mixing, 14.5 parts of polyethylene glycol are added and the stirring continued until the polyethylene glycol is dispersed. The polyethylene glycol has a molecular weight of 1000, a neutral pH in water, and has a melting point of 38 degrees Celcius. Then 0.25 parts of a surfactant, a nonionic mixture of 2,4,7,9-tetra-methyl-5-decyne-4,7-diols is added dropwise. Finally 0.25 parts of Methyl Paraben preservative is added. The preservative used is the methyl ester of para-hydroxy benzoic acid. The final mixture is stirred for five minutes until the preservative dissolves to form a concentrate. One part by volume concentrate is mixed with 10 parts by volume water to form a coating composition of the present invention.

Example 6

A plant treating composition was formulated starting with 200 parts (100 parts by dry weight) of Hycar 26120 latex. The latex is described above. To the latex is added slowly with stirring 195 parts of deionized water. While continuing mixing, 2 parts of polyvinylprrolidone (PVP) are added and the stirring continued until the PVP is dispersed. The PVP is a brittle solid, containing about 5% moisture, and a molecular weight of about 10,000. Then 0.25 parts of surfactant, a nonionic mixture of 2,4,7,9-tetra-methyl-5-decyne-4,7-diols, is added dropwise. Finally 0.25 parts of Methyl Paraben preservative is added. The preservative used is the methyl ester of para-hydroxy benzoic acid. The final mixture is stirred for five minutes until the preservative dissolves to form a concentrate. One part by volume concentrate is mixed with 10 parts by volume water to form a coating composition of the present invention.

Example 7

Example 6 was repeated except that the PVP was replaced with a chemically modified starch. The starch was obtained from American Maizo Products Co. of Hammond, Ind. The starch used was Maizo 745, an hydroxy ethyl ether of corn starch containing 1.6 to 2.0% of derived ethylene oxide based on a dry weight of starch. The starch contains 10 to 12% moisture and has a pH of 5.5–6.5. The starch is a dry powder. It is precooked at 200 degrees Fahrenheit and added to the latex at a level of 2 to 5% based on weight of acrylic in the latex.

In arriving at the above formulations, a number of other formulations were made and tested on plants before the formulations were optimized. To avoid gel formation, it is preferred that the acrylic latex compositions used in the present invention not contain a sufficient amount of polymerized unsaturated carboxylic acid to change the solid films formed into gels. It is more preferred that the acrylic latex be substantially free of polymerized unsaturated carboxylic acid.

While only specific embodiments of the method and composition of this invention have been illustrated by the enumerated examples, many modifications can be made to the method and polymeric composition without departing from the spirit of the invention. All such modifications that fall within the scope of the appended claims are intended to be embraced thereby.

I claim:

1. A method of preserving the life of a growing living plant, planted in soil or other growth media, comprising coating at least a portion of the growing, living plant with a nonphytotoxic film consisting essentially of an acrylic latex and from 1% to 45% by dry weight, based on dry weight of acrylic polymer, of a water soluble or dispersible polymer, the film having a moisture vapor transmission rate of from 5 grams per square meter per 24 hours to about 3000 grams per square meter per 24 hours.

2. The method of claim 1 wherein the acrylic latex is an acrylic copolymer latex.

3. The method of claim I wherein the composition contains about 0.1% to about 3% of a surfactant, and about 0.2 to about 3% of an antimicrobial agent, the percentages base on total weight of composition.

4. The method of claim 1 wherein the water soluble polymer is a water solubilized casein product.

5. The method of claim 1 wherein the water soluble polymer is a gelatin that is derived from fish protein.

6. The method of claim 1 wherein the water soluble polymer is a polyvinyl alcohol made by hydrolyzing from 85% to 89% fo the acetate groups from polyvinyl acetate.

7. The method of claim 1 wherein the water soluble polymer is a polyethylene glycol of about 800 to 8000 in molecular weight.

8. The method of claim 1 wherein the water soluble polymer is a polyvinylpyrrollidone.

9. The method of claim 1 wherein the water soluble polymer is a chemically derived plant starch.

10. The method of claim 1 wherein two or more water soluble polymers are present having a combined weight of from 1% to 45% by dry weight of dry weight of dry weight of acrylic polymer in the acrylic latex.

11. The method of claim 1 wherein the film contains less than 10% of water.

12. The method of claim 1 wherein the film is a dry film.

13. A method of preserving the life of a living plant planted in soil or other growth media, comprising coating at least a portion of the growing, living plant with a nonphtotoxic film consisting essentially of an acrylic latex and from 1% to 45% by dry weight, based on dry weight of acrylic polymer, of a water soluble or dispersible polymer, the film having a moisture vapor transmission rate of from 5 grams per square meter per 24 hours to about 3000 grams per square meter per 24 hours.

14. The method of claim 13 wherein the film has a moisture vapor transmission rate of from about 150 grams per square meter per 24 hours to about 2000 grams per square meter per 24 hours.

15. The method of claim 13 wherein the film has a moisture vapor transmission rate of from about 100 grams per square meter per 24 hours to about 1000 grams per square meter per 24 hours.

16. The method of claim 13 wherein the film has a non-foam structure.

17. The method of claim 13 wherein the acrylic polymer has a glass transition temperature of from about −10 degrees Celcius to about 30 degrees Celcius and the film has sufficient oxygen and carbon dioxide permeability to support plat life.

18. The method of claim 13 wherein the film is removed by water washing.

19. A method of preserving a fruit or vegetable comprising coating the fruit or vegetable with a nonphytotoxic film consisting essentially of an acrylic latex and from 1% to 45% by dry weight, based on dry weight of acrylic polymer, of a water soluble or dispersible polymer, the film having a moisture vapor transmission rate of from a small but sufficient amount to perserve the fruit or vegetable to about 3000 grams per square meter per 24 hours.

20. The method of claim 19 wherein the film has sufficient oxygen and carbon dioxide permeability to support respiration of the fruit or vegetable.

21. A method of preserving a cut flower comprising coating the cut flower with a nonphytotoxic film consisting essentially of an acrylic latex and form 1% to 45% by dry weight, based on dry weight of acrylic polymer, of a water soluble or disperisible polymer, the film having a moisture vapor transmission rate of from a small but sufficient amount to perserve the flower to about 2000 grams per square meter per 24 hours and sufficient carbon dioxide permeability to support respiration of the cut flower.

* * * * *